(12) United States Patent
Lingen et al.

(10) Patent No.: US 10,981,092 B2
(45) Date of Patent: Apr. 20, 2021

(54) FILTER DEVICE

(71) Applicant: HYDAC PROCESS TECHNOLOGY GMBH, Neunkirchen (DE)

(72) Inventors: Hans-Juergen Lingen, Moenchengladbach (DE); Stefan Klein, Bad Muenstereifel (DE); Raphael Klein, Frechen (DE); Sebastian Hrin, Elsdorf (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 26 days.

(21) Appl. No.: 16/478,893

(22) PCT Filed: Feb. 27, 2018

(86) PCT No.: PCT/EP2018/054770
§ 371 (c)(1),
(2) Date: Jul. 18, 2019

(87) PCT Pub. No.: WO2018/158230
PCT Pub. Date: Sep. 7, 2018

(65) Prior Publication Data
US 2019/0381430 A1 Dec. 19, 2019

(30) Foreign Application Priority Data
Mar. 1, 2017 (DE) ..................... 10 2017 001 968.1

(51) Int. Cl.
*B01D 29/68* (2006.01)
*B01D 29/23* (2006.01)
*B01D 29/52* (2006.01)

(52) U.S. Cl.
CPC ........... *B01D 29/682* (2013.01); *B01D 29/23* (2013.01); *B01D 29/52* (2013.01); *B01D 2201/081* (2013.01)

(58) Field of Classification Search
CPC ...... B01D 29/682; B01D 29/23; B01D 29/52; B01D 2201/081; B01D 2201/0407;
(Continued)

(56) References Cited

U.S. PATENT DOCUMENTS

2017/0128860 A1* 5/2017 Cartarius ............... B01D 29/94

FOREIGN PATENT DOCUMENTS

DE  10 2007 014 573   9/2008
DE  20 2014 104 200   10/2015
(Continued)

OTHER PUBLICATIONS

International Search Report (ISR) dated Jun. 7, 2018 in International (PCT) Application No. PCT/EP2018/054770.

*Primary Examiner* — Madeline Gonzalez
(74) *Attorney, Agent, or Firm* — Wenderoth, Lind & Ponack, L.L.P.

(57) ABSTRACT

The invention relates to a filter device, in particular for filtering lubrication, consisting of at least one filter insert (19), in which a respective filter material (27) is received and which is provided with fluid passage points (70) that are delimited by wall parts (63) of the filter insert (19) and with a backflush device (37, 49) that has at least one flush nozzle (49), said flush nozzle being movable along the interior of the respective pairable filter insert (19) by means of a hollow drive shaft (37). The invention is characterized in that at least one pair of flush nozzles (49) is provided for each filter insert (19, 21), said flush nozzles having longitudinal slots (73, 74) which are arranged one over the other in the axial direction of the drive shaft (37), wherein the longitudinal slots have an offset relative to one another which runs transversely to the axial direction such that for adjacent flush nozzles (49), at least one part of the longitudinal slot (73) of one flush nozzle (49) overlaps with at least one of the fluid
(Continued)

passage points (70) of the pairable filter insert (19, 21) and at least one part of the longitudinal slot (74) of the other flush nozzle (49) at least partly overlaps with the wall parts (63) which delimit the aforementioned fluid passage point of the filter insert (19, 21).

15 Claims, 6 Drawing Sheets

(58) Field of Classification Search
   CPC ........ B01D 2201/082; B01D 2201/291; B01D
       2201/4038; B01D 29/232; B01D 35/147;
       B01D 29/54; B01D 29/58; B01D 29/688;
       B01D 33/35; B01D 33/37; B01D 33/503;
        B01D 33/50; B01D 29/0075; B01D
        29/0077; B01D 29/62; B01D 29/64;
         B01D 29/6438; B01D 29/68
   USPC ......... 210/333.01, 333.1, 393, 408, 411, 427
   See application file for complete search history.

(56)      References Cited

FOREIGN PATENT DOCUMENTS

| | | |
|---|---|---|
| DE | 20 2016 003 089 | 6/2016 |
| WO | 2016/085107 | 6/2016 |

* cited by examiner

FILTER DEVICE

FIELD OF THE INVENTION

The invention concerns a filter device, in particular for the filtration of lubricating oil, comprised of at least one filter insert that retains a filter material. The filter insert is provided with fluid passages, which are constricted by wall parts of the filter insert. A backflush device is provided with at least one flushing nozzle, which is displaceable along the inside of the respective associated filter insert by a hollow drive shaft.

BACKGROUND OF THE INVENTION

Keeping the lubricating oil in perfect condition is of major significance for the operational reliability and life span of combustion engines. In particular, the continuous operation of diesel engines that, for example in maritime applications, are operated with heavy fuel oil, make particularly high demands on the condition of the lubricating oil, making the use of filter devices for cleaning the lubricating oil in applications of this kind essential. The prior art in this respect is to use filter devices where the filter inserts can be backflushed to achieve longer operating times between filter insert changes to keep maintenance costs low. An example of such a filter device is described in DE 202016 003 089 U1.

SUMMARY OF THE INVENTION

An object of the invention to provide an improved filter device of this kind, which is characterized by particularly advantageous operating characteristics, especially when in backflush mode.

This object is basically met by a filter device having, as a significant feature of the invention, at least one pair of flushing nozzles for each filter insert. The flushing nozzles are provided with longitudinal slots that are arranged in axial direction of the drive shaft one above the other. The longitudinal 5 slots are offset towards each other transverse to the axial direction in such a way that, for adjacently disposed flushing nozzles, at least part of the longitudinal slot of the one flushing nozzle overlaps with at least one of the fluid passages of the assignable filter insert, and at least part of the longitudinal slot of the other flushing nozzle overlaps at least partially the wall parts of this filter insert that constrict the fluid passage.

Of the flow paths, which are available for the backflush flow and which are constricted at the fluid passages by the wall parts of the filter insert, one flow path is open while the flow path at the following fluid passage is closed in this arrangement. With a continuous rotation of the flushing nozzle pairs, the backflush flows merge into each other through the overlap of the backflushing nozzles so that it settles into a continuous backflush volume. As a result of the backflush action that is pulsation-dampened in this manner, the pulsating force applied to the respective flushing nozzle, caused by the repeated flow interruption, is avoided. Since a pair of offset flushing nozzles is provided for each filter insert, the advantageous pulsation-damping action can also be achieved in filter devices with only a single filter insert.

In advantageous exemplary embodiments, the respective filter insert is provided with a filter housing with two housing walls that are disposed concentrically to the longitudinal axis of the filter insert. The filter material extends between those housing walls, which are penetrated by window-shaped fluid passages.

The arrangement is advantageously provided such that each pair of flushing nozzles passes over the adjacently disposed fluid passages in the filter housing by a motor-driven drive shaft of the backflush device in succession along the inside of the respective associable, cylindrical filter insert in a rotatory manner.

In particularly advantageous exemplary embodiments, the drive shaft is provided with a guide device for each pair of flushing nozzles that protrudes in the direction towards the associable filter housing. The respective flushing nozzle engages with the guide device and is guided in a longitudinally displaceable manner. The flushing nozzle is pressed against the inside of the filter housing by an energy store. This pressing allows for a particularly secure and soft seating of the respective nozzle pair on the drive shaft. Jamming or tilting is avoided due to the guide device.

The energy store may advantageously be provided in form of an elastic sealing ring. The sealing ring presses with its one side against the drive shaft and with its other side against the respective flushing nozzle.

In particularly advantageous exemplary embodiments, a pair of flushing nozzles is combined into a single unit that, with its internal cross-section in radial direction, ends in the hollow drive shaft via the guide device. The unit outer cross-section in the radial direction leads into a longitudinal slot that, with respect to its dimensions, is adapted to the geometry of the respective fluid passage that is passed over.

The arrangement may advantageously be such that both housing walls of a filter housing, which walls act as supports, are closed at their opposing ends by an annular end part. The end part comprises a fluid compartment for holding unfiltrate. An annular separating wall passes through the filter housing between the two supports. The separating wall is preferably formed by an internal and an external support ring. The components that form the filter housing may advantageously be made from injection-molded plastic, such as PA6.

Longitudinal rods may extend for each housing wall between the end parts and the separating wall located in between. The longitudinal rods enclose the window-shaped fluid passages in cage manner in the filter housing between them.

The two longitudinal slots of a pair of flushing nozzles may be offset with respect to each other so that, in conjunction with the cage arrangement of the fluid passages, there is always a flow path open, at least partially, preferably fully, via the one flushing nozzle, while the flow path into the other flushing nozzle is at least partially, preferably fully, closed. During a continuous rotation of the drive shaft of the backflush device, there is then always a continuous flow through one of the two flushing nozzles of a pair from the filtrate side.

In a particularly advantageous manner, the internal longitudinal rods of the cage arrangement, located adjacent to the respective pair of flushing nozzles, may be slanted with respect to the radial direction so that they force a flow direction for each fluid passage of a filter insert, which is slanted by a predeterminable angle with respect to the inflow direction of the respective longitudinal slot of a pair of flushing nozzles. This slanting causes an oblique flow through the filter medium, which facilitates the dislodging of contaminants.

The arrangement is advantageously designed such that the filtration takes place from the inside of the respective filter insert to the outside. The backflushing action of the respective filter insert takes place from outside to inside. The resulting backflush volumes can be discharged from the filter device via the backflush device. The respective filter insert is disposed stationary in a device housing, which comprises a fluid inlet for unfiltrate, a fluid outlet for filtrate and a discharge connection for the respective backflush volume.

Of particular advantage may be to use multiple non-variable filter inserts, stacked one above the other, to form a full element assembly. The individual filter inserts are permanently attached to each other, preferably by way of adhesive bonding.

In this instance, it may be of particular advantage to make the arrangement so that the full element assembly, together with the backflush device as a complete entity, is replaceably retained in the device housing.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
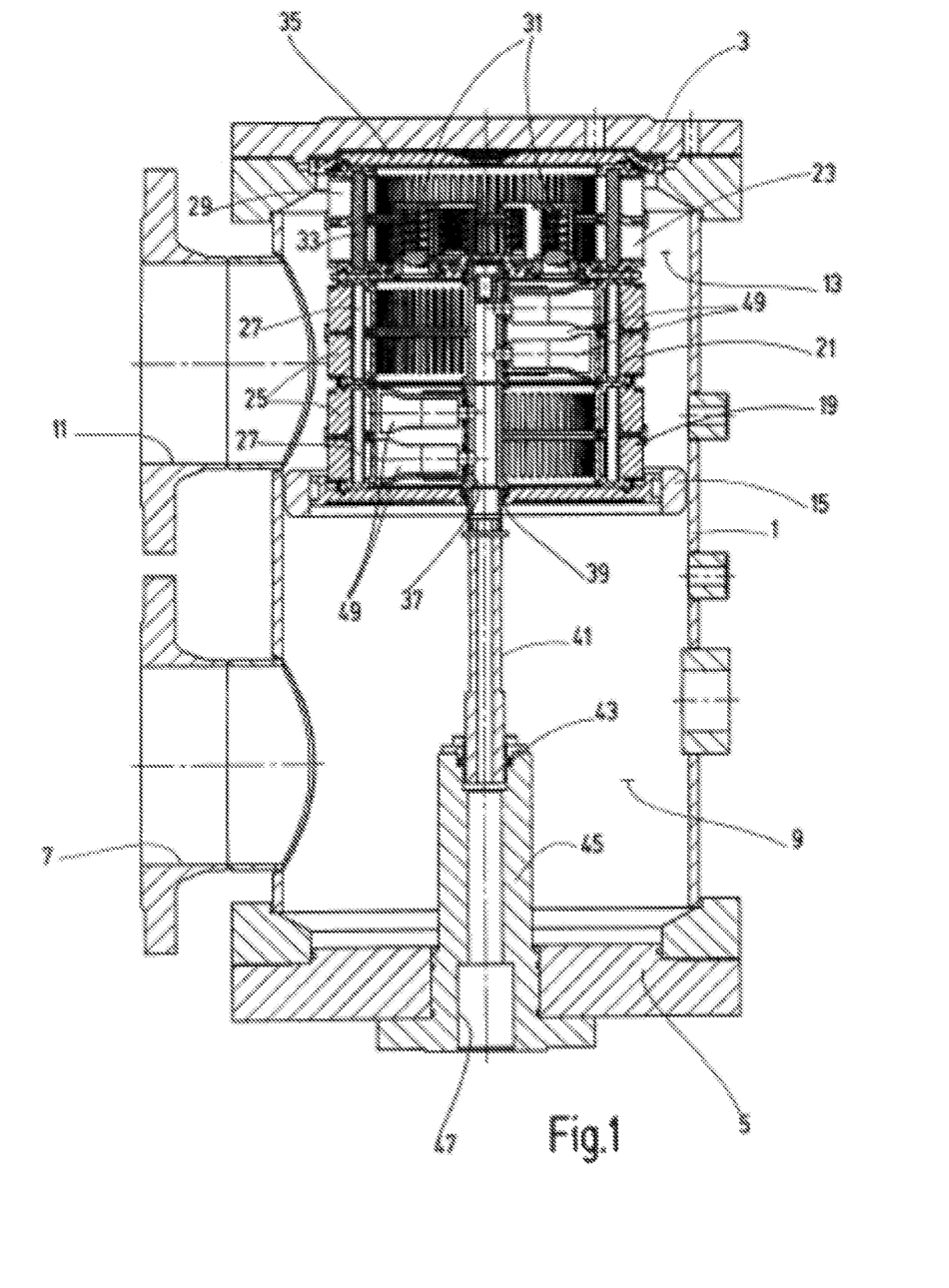
FIG. 1 in schematically simplified side view in section of a filter device according to an exemplary embodiment of the invention.
Figure 2:
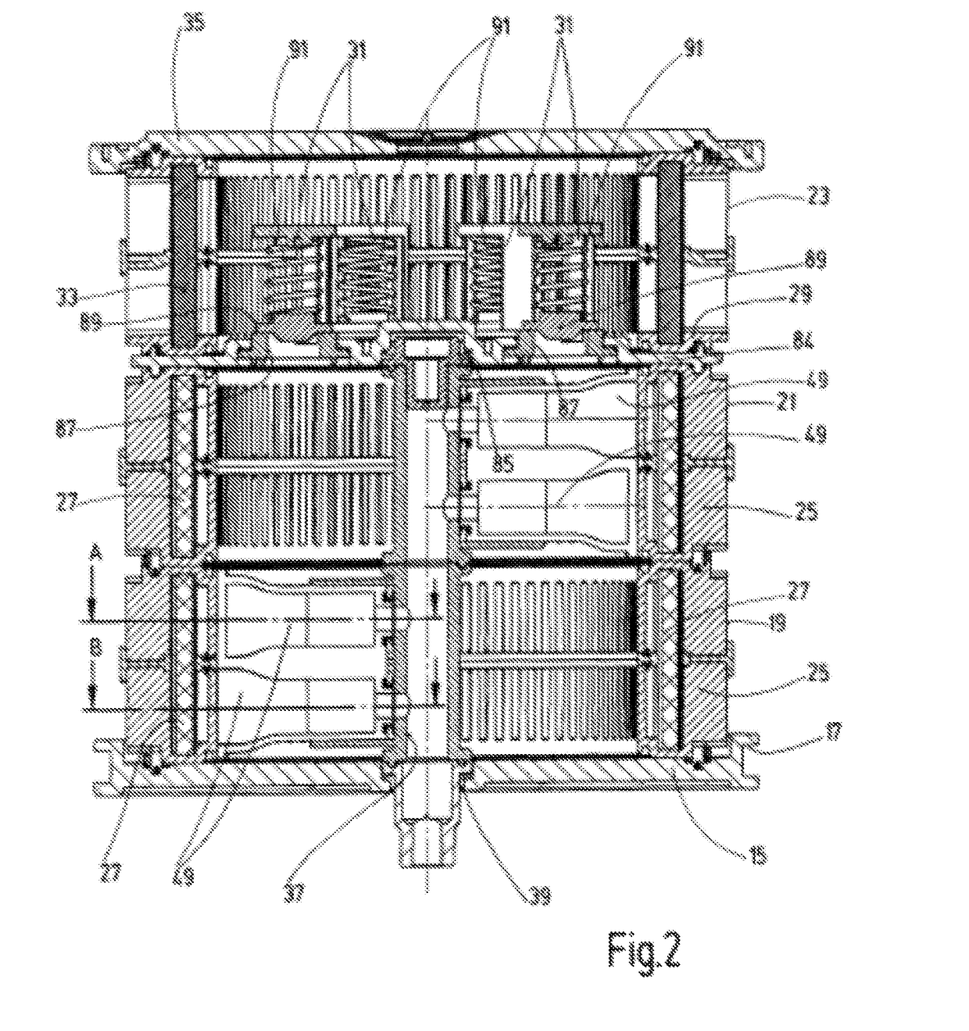
FIG. 2 is a side view in section of the filter insert of the filter device of FIG. 1, shown enlarged compared to FIG. 1.

The exemplary embodiment of the filter device according to the invention shown in FIG. 1 comprises a device housing with a main housing part 1 in form of a circular cylinder. Housing part 1 is closed at the upper end, as shown in the drawing, by a housing cover 3 and at the lower end by a bottom part 5. A lateral inlet 7 is located within proximity of bottom part 5 through which the unfiltrate flows into a cavity 9 that forms the dirty side. Located above the inlet 7 and in the vicinity of the upper housing cover 3 is a lateral outlet 11 through which the filtrate is able to flow out from a cavity 13 that forms the clean side. The dirty side cavity 9 and the above-located clean side cavity 13 are separated by a strainer plate 15 that, as shown in FIG. 2, is provided with a circumferential annular groove 17 that forms the seat for a sealing element (not shown). That sealing element forms the seal between the dirty side and the clean side. The strainer plate 15 also serves as support for three filter inserts 19, 21 and 23, stacked one above the other, which are shown separately in FIG. 2. Of these filter inserts, the lower filter inserts 19 and 21 comprise a filter housing 25 with filter material 27 and a backflush device, which is shown in greater detail in FIGS. 3 to 6. The filter housing 25 of each of the filter inserts 19, 21 is shown in greater detail in FIGS. 7 to 12. The uppermost filter insert 23 is provided in filter housing 29 with a group of bypass valves 31 as well as a coarse filter 33. At the upper end, the housing 29 of the uppermost filter insert 23 is closed by a bypass cover 35.

The backflush devices in the filter inserts 19 and 21 are attached to a drive shaft 37 that is provided in form of a hollow shaft. At a bearing point 39 on the strainer plate 15, a further hollow shaft 41 follows on from drive shaft 37. The lower end of the hollow shaft 41 forms a pivot bearing and engages with a pipe socket 45, which extends from bottom part 5 into cavity 9 of the dirty side. The pipe socket 45 continues the flow path provided for backflush volumes, which starts at the drive shaft 37 in the filter inserts 19 and 21, down to an outlet 47 at the bottom part 5. A backflush valve, which is commonly provided at outlet 47, is omitted, as is the known drive that is commonly used on devices of this kind, which rotates the drive shaft 37 of the backflush device through a clutch connection with the hollow shaft 41. In a manner already known, the drive may be operated by a motor or through pressure system. For each of the lower filter inserts 19 and 21, the backflush device is provided with a pair of flushing nozzles 49, of which each pair, as shown in FIGS. 1 and 2, is attached to the drive shaft 37, rotationally offset by 180° and axially one above the other. The details of the flushing nozzles 49 are shown most clearly in FIGS. 3 to 6 and are described below.

Figures 9, 10:
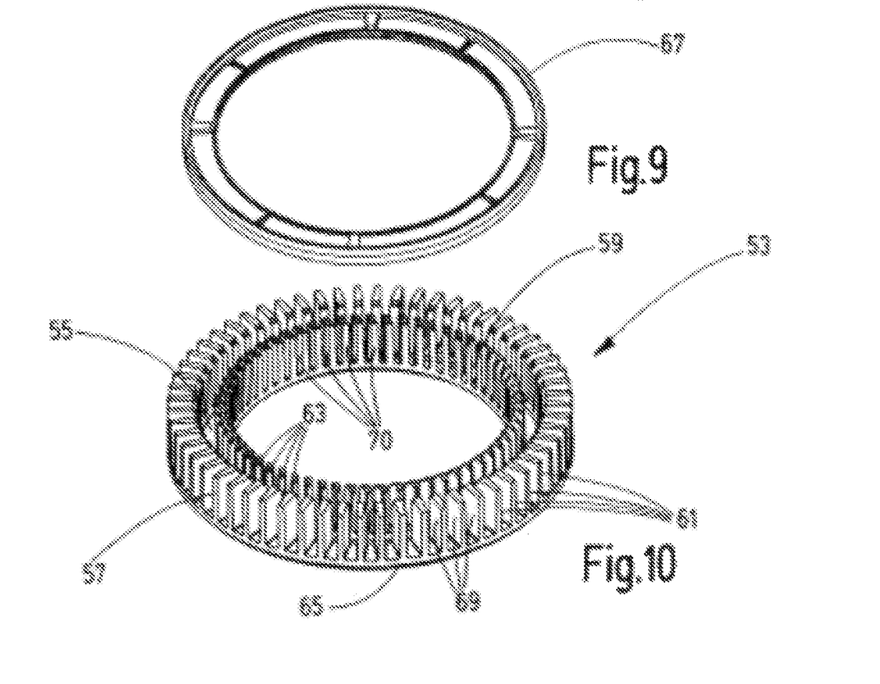

Details for the as non-variable parts provided filter housings 25 for the lower filter inserts 19 and 20 are best shown in FIGS. 7 to 12. The filter housings 25 are provided with an upper support 51, which is shown separately in FIG. 7, as well as a lower support 53, which is shown separately in FIG. 10. As is shown most clearly in FIG. 10 for the lower support 53, both supports 51, 53 are provided with two housing walls that extend concentric to the longitudinal axis of the housing and form an intermediate space 55 between them (FIG. 10). The outer housing wall 57 and the inner wall 59 form the two housing walls. Each housing wall 57, 59 is formed by an annulus of a plurality of longitudinal bars 61 and 63, respectively, of which only a small number are referenced in FIGS. 7 and 10 for reasons of clarity. The longitudinal bars 61 and 63 of the upper support 51 extend downwardly from an upper end part 64, which is formed by an annular body. Correspondingly, the longitudinal bars 61 and 63 of the lower support 53 extend upwardly from a lower end part 65, which is also formed by an annular body. The filter housing 25 is completed by the filter material 27, which is seated in the intermediate space 55 of the upper support 51 and the lower support 53. The filter material 27 is formed of a pleated web of a filter mat of at least one filter layer with a support layer in form of a lattice structure on both of its outer sides. In advantageous examples, the filter fineness is in the range between 25 and 34 µm. After inserting the respective filter material 27 into the intermediate spaces 55 of the upper and lower supports 51, 53 when assembling the filter housing 25, a separating wall is formed through attaching an inner support ring 66, shown in FIG. 8, to the ends of the inner longitudinal bars 63, and through attaching an outer support ring 67, shown in FIG. 9, which butts up against the free ends of the outer longitudinal bars 61. The components depicted separately in FIGS. 7 to 10, which are injection-molded from a plastic material, such as PA6 and provided with an oil-proof coating if required, are then permanently attached to each other, for example through welding or preferably adhesive bonding.

Figure 11:
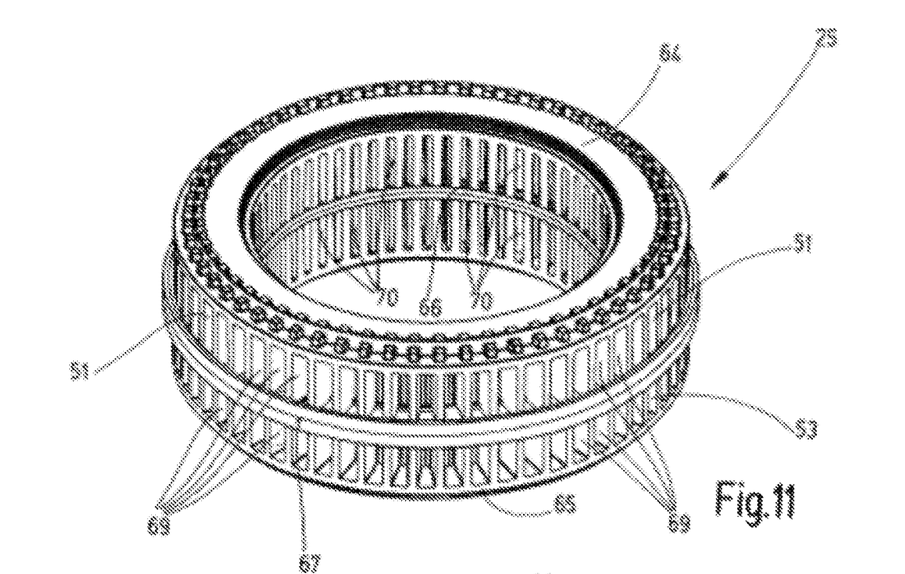
FIG. 11 is a perspective view of the filter housing assembled from the components in FIGS. 7 to 10, viewed from the top.
Figure 12:
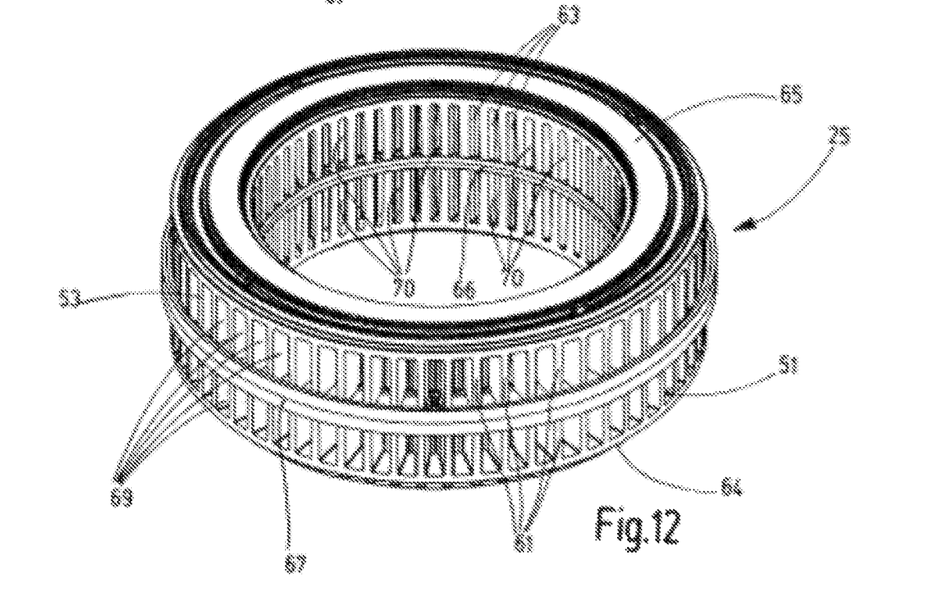
FIG. 12 is a perspective view of the filter housing assembled from the components in FIGS. 7 to 10, viewed from the bottom of the filter housing.

With the filter housing 25 assembled from the supports 51 and 53, the longitudinal bars 61 and 63 of the lower and upper supports 53 and 51, respectively, are aligned to each other so that between adjacent bars 61 the outer fluid passages 69 are formed and between the inner longitudinal bars 63 the inner fluid passages 70 respectively are formed, which are only partially referenced in FIGS. 11 and 12. In the present exemplary embodiment, in which two filter inserts 19 and 21 are disposed one above the other, the filter housings 25 of the filter inserts 19 and 21 are permanently attached to each other. To this end the upper end part 64 of the lower filter housing 25 is adhesively bonded to the lower end part 65 of the upper filter housing 25.

Figure 3:
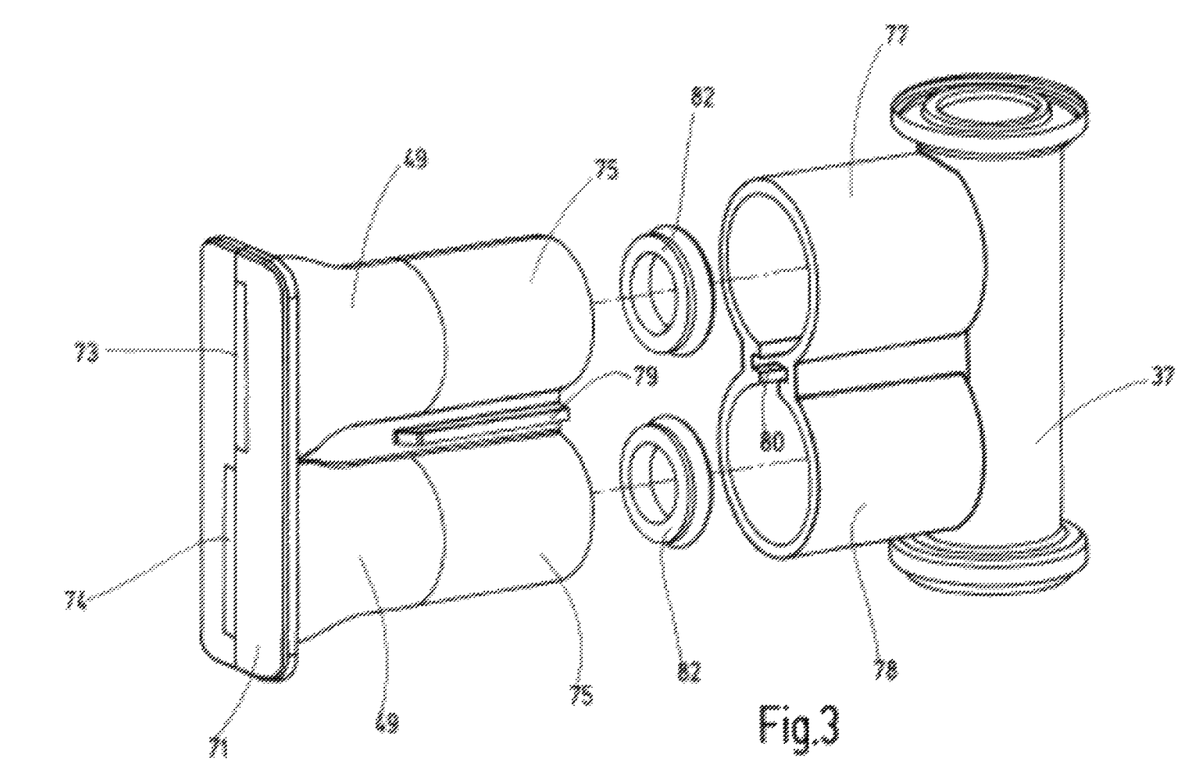
FIG. 3 is an exploded, perspective view of a pair of flushing nozzles, shown enlarged, with an associated guide device disposed on the drive shaft of the exemplary embodiment.
Figure 4:
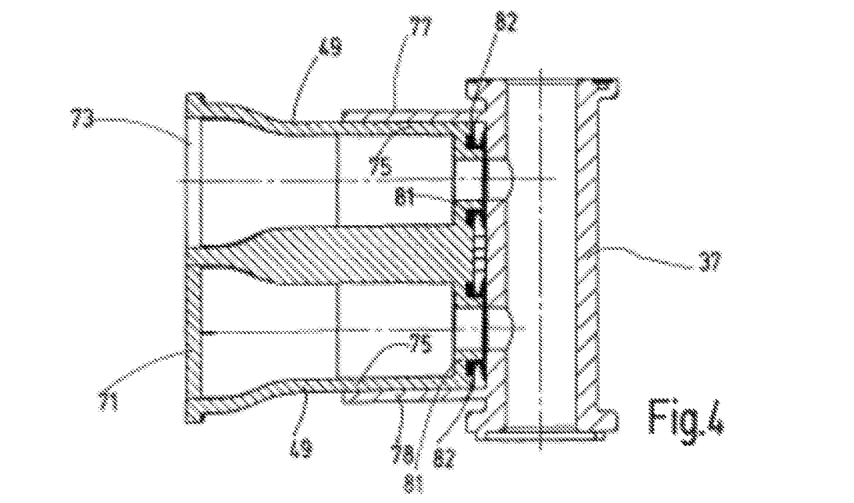
FIG. 4 is a side view in section of the assembled unit of FIG. 3.

As already mentioned, FIGS. 3 to 6 depict details of the backflush device. In FIGS. 3 and 4, a pair of flushing nozzles 49 together with the respective section of the drive shaft 37 are shown separately. The pair of flushing nozzles 49 is combined into a single-piece, molded shape, which is injection-molded from a plastic material such as PA6. Disposed at the end that faces away from the drive shaft 37 is a face plate 71, oriented in axial direction and extending over the entire height of the flushing nozzles 49. When in operation and with the drive shaft 37 rotating, the face plates 71 move in the immediate proximity of the internal circumference of the inner longitudinal bars 63 of the filter housing 25. To this end the face plate 71 is provided with a slight curvature that adapts to the geometry of the inner circumference. The face plate 71 is provided with a longitudinal slot 73 that extends in axial direction and serves as inlet for the upper flushing nozzle 49, as well as a longitudinal slot 74 that also extends in axial direction and serves as inlet for the lower flushing nozzle 49.

Figure 5:
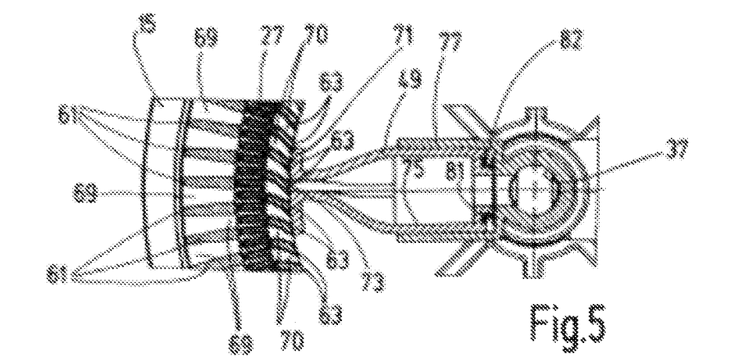
FIG. 5 is a partial top plan view in section of the filter insert corresponding to line A-A in FIG. 2.
Figure 6:
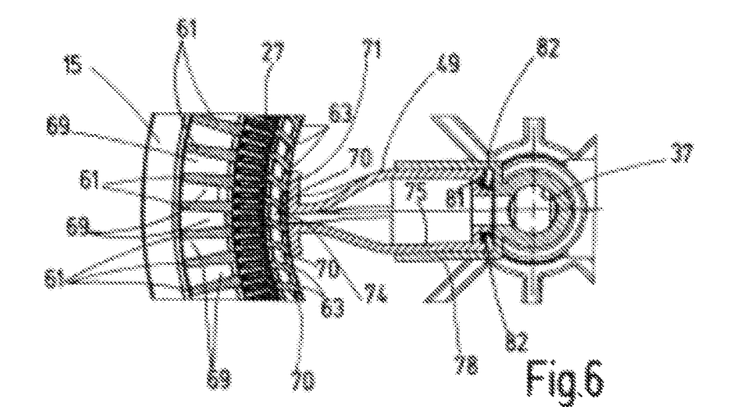
FIG. 6 is a partial top plan view in section of the filter insert taken along the line B-B in FIG. 2.
Figures 7, 8:
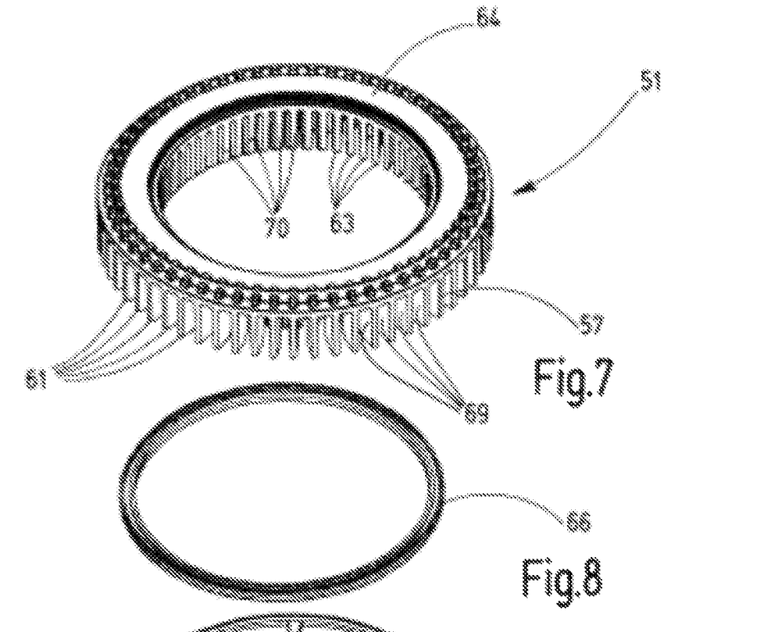
FIGS. 7 to 10 are perspective views of components of the filter housing of a filter insert of FIG. 2.

As shown in FIG. 3, the longitudinal slots 73, 74 are offset with respect to each other in the rotational direction. As is apparent from FIGS. 4 to 6, the fluid path extends in the flushing nozzles 49 from the longitudinal slot 73, 74 to a radially internally-located tubular body 75. To form the connection between the pair of flushing nozzles 49 and the drive shaft 37, an upper tube 77 and a lower tube 78 are attached to the drive shaft 37. The upper and lower tubes lead into the inside of the hollow drive shaft 37. The tubes 77, 78 form together with the tubular bodies 75, which engage with the tubes, a telescope guide device for the pair of flushing nozzles 49. The guide device is completed by lateral guide bars 79, which extend between the tubular bodies 75 of the flushing nozzles 49 in radial direction. The guide bars 79 engage with a guide groove 80 between the tubes 77, 78 (see FIG. 3). As shown in FIGS. 4 to 6, collars 81, each of which protrudes radially inward and forms the seat for a sealing ring 82, are disposed at the radially internally positioned discharge end of the tubular bodies 75. The sealing rings 82 are of an elastic material so that they assume a dual function, that is, they provide a sealing function and act as an energy store that applies a radially outward-directed tension on the flushing nozzles 49, which are telescopically guided by the guide device.

When in operation, the unfiltrate supplied via the inlet 7 passes into the dirty-side cavity 9 and from there via the passages in the strainer plate 15 into the inner cavity of the filter housings 25 of the filter inserts 19 and 21, flows through their filter material 27 during the filtration process from inside to outside towards the clean-side cavity 13 and is discharged from there via outlet 11. The backflushing action takes place with the backflush outlet 47 opened by the backflush valve (not shown) and with rotating flushing nozzles 49. The flow rate of the backflush volume is caused by the operating pressure of the inflowing unfiltrate, for example an oil pressure in the range between 8 and 10 bar, due to the pressure drop with respect to the open backflush outlet 47. The fluid path within the flushing nozzles 49 expands with respect to opening cross-section of the longitudinal slots 73, 74 towards the drive shaft 37, which results in a venturi effect that increases the flow velocity in the immediate vicinity of the longitudinal slots 73, 74, which facilitates the detachment of contaminants.

As a comparison of FIGS. 5 and 6 shows, the offset of the longitudinal slots 73, 74 in rotational direction is chosen such that a longitudinal slot, in the depiction of FIGS. 5 and 6 the upper longitudinal slot 73, is aligned with a longitudinal web 63 of the filter housing 25, so that the fluid path to the flushing nozzle 49 is closed, while at the same time the other longitudinal slot 4 is aligned with a fluid passage 70 (FIG. 6). The backflush action with this arrangement takes place essentially continually, that is, without significant pulsations of the backflush volume. At the same time the flow rate of the backflush volume is correspondingly limited since at any time the full passage cross-section of only one fluid passage 70 is available. As is also apparent from FIGS. 5 and 6, the inner webs 63 are slanted with respect to the radial direction, so that the flow direction of the flow through the longitudinal slots 73, 74 is slanted with respect to the radial direction. This slanting causes a flow direction in the intermediate space 55 with the pleated filter material 27 in which the flow passes rather through the wide sides of the pleats of the material 27, which facilitates the cleaning action during the backflush process.

As already mentioned, a third filter insert 23 is disposed above the filter insert 21 in the depicted exemplary embodiment. The filter housing 29 of the uppermost filter insert 23 is provided with a bottom plate 84 (FIG. 2), which is attached to the upper end part 64 of the adjacent filter insert 21, for example through adhesive bonding. The bottom plate 84 is provided with a pivot bearing 85 for the upper end of the drive shaft 37, as well as valve openings 87 for the bypass valves 31 located in the filter housing 29 of the uppermost filter insert 22. The bypass valves 31 are provided with valve bodies 89, which are preloaded into a shut-off position by compression springs 91 that closes the valve openings 87. If the filter material 27 of the filter inserts 19, 21 is blocked, which causes the opening of the valve openings 87, unfiltrate flows into the inner cavity of the bypass filter insert 23, exits via the coarse filter 33 and ends up in the clean-side cavity 13. Together with the coarse filter 33, this forms a safety facility which ensures the supply of oil even if the filter material 27 is blocked.

While one various embodiment has been chosen to illustrate the invention, it will be understood by those skilled in the art that various changes and modifications can be made therein without departing from the scope of the invention as defined in the claims.

The invention claimed is:
1. A filter device, comprising:
a first filter insert retaining a filter material and having first and second sets of fluid passages separated by first and second wall parts, respectively, of the first filter insert, the first and second sets of fluid passages being spaced from one another along a longitudinal axis of the first filter insert; and a backflush device being displaceable along an inside of the first filter insert by a hollow drive shaft and having first and second flushing nozzles located within the first filter insert, the first and second flushing nozzles being adjacent one another and having first and second longitudinal slots, respectively, extending in an axial direction of the hollow drive shaft and being offset in the axial direction and in a transverse direction to the axial direction by a distance unequal to zero, the first longitudinal slot overlapping and being open to a respective one of the first set of fluid passages while the second longitudinal slot overlaps and is constricted by a respective one of the second wall parts, the second longitudinal slot overlapping and being open to a respective one of the second set of fluid passages while the first longitudinal slot overlaps and is constricted by a respective one of the first wall parts.

2. A filter device according to claim 1 wherein
the first filter insert comprises a filter housing with inner and outer housing walls disposed concentrically to a longitudinal axis of the filter insert, the filter material extending between the inner and outer housing walls, the inner housing walls being penetrated by the first and second sets of fluid passages, the fluid passages being window shaped.

3. A filter device according to claim 2 wherein
the inner and outer housing walls comprise supports closed at opposing ends thereof by first and second annular end parts, respectively, forming an unfiltrate fluid compartment; and
an annular separating wall passes through the filter housing between the supports.

4. A filter device according to claim 3 wherein
the annular separating wall comprise internal and external support rings.

5. A filter device according to claim 3 wherein
the inner and outer housing walls comprise longitudinal rods extending from the first and second annular end parts and the separating wall located between the longitudinal rods, the longitudinal rods forming the first and second wall parts and the first and second sets of fluid passages therebetween.

6. A filter device according to claim 5 wherein
the longitudinal rods comprise internal rods forming a cage and being located adjacent the first and second flushing nozzles and being slanted in a radial direction relative to the hollow drive shaft forcing a fluid flow in the first and second sets of fluid passages in directions slanted at a predeterminable angle relative to an inflow direction of the respective longitudinal slot.

7. A filter device according to claim 1 wherein
the hollow drive shaft is rotatably drivable by a motor and passes the first and second longitudinal slots of the first and second flushing nozzles in succession along insides of the first and second sets of fluid passages and the first and second wall parts, respectively.

8. A filter device according to claim 1 wherein
the hollow drive shaft comprises first and second guides engaged to and guiding the first and second flushing nozzles, respectively, in longitudinal displaceable manners, the first and second guides protruding toward a filter housing of the first filter insert from the drive shaft; and
an energy store biases the first and second flushing nozzles against an inside of the first and second sets of fluid passages, respectively, and the first and second wall parts, respectively.

9. A filter device according to claim 8 wherein
the energy store comprises elastic sealing rings having one sides bearing against the drive shaft and opposite sides bearing against the respective flushing nozzles.

10. A filter device according to claim 8 wherein
the first and second flushing nozzles are fixedly connected to one another into a single unit, have internal cross-sections extending radially relative to the hollow drive shaft via the first and second guides ending in the hollow drive shaft, and have outer cross sections extending in a radial direction relative to the hollow drive shaft leading to the first and second longitudinal slots, respectively, the first and second longitudinal slots having geometries corresponding to geometries of the first and second sets of fluid passages, respectively.

11. A filter device according to claim 1 wherein
filtration flow in the first filter insert is capable of occurring from an inside to an outside of the first filter insert; and
backflushing flow in the first filter insert is capable of occurring from the outside to the inside of the first filter insert, with backflush volumes being discharged from the first filter insert.

12. A filter device according to claim 1 wherein
the first filter insert is disposed stationary in a device housing, the device housing having an unfiltrate fluid inlet, a filtrate fluid outlet and a backflush volume discharge connection.

13. A filter device according to claim 1 wherein
a second filter insert, with the filter material and the first and second sets of fluid passages and the backflush device of the first filter inset, is stacked on the first filter insert forming a full element assembly, the first and second filter inserts being fixed attached.

14. A filter device according to claim 13 wherein
the first and second filter inserts are fixedly attached by adhesive bonding.

15. A filter device according to claim 1 wherein
the first filter insert is replaceable retained in a drive housing.

* * * * *